Dec. 15, 1970    E. E. HEWITT    3,547,741
FRICTION WELDING TOOL

Original Filed Feb. 25, 1966    2 Sheets-Sheet 1

INVENTOR
Eugene E. Hewitt

Jack Posin
ATTORNEY

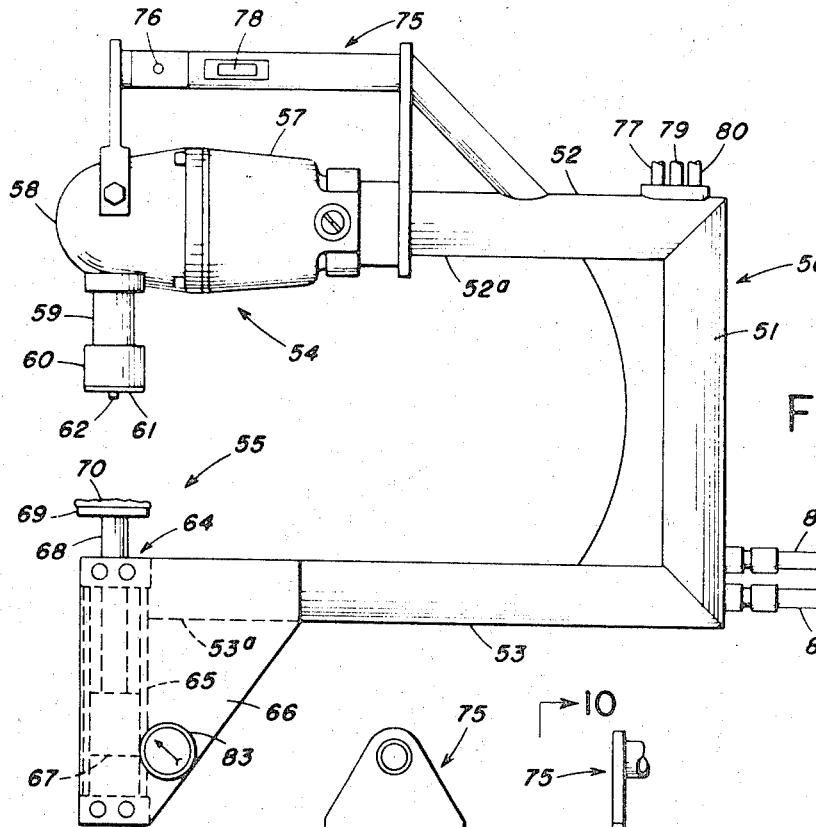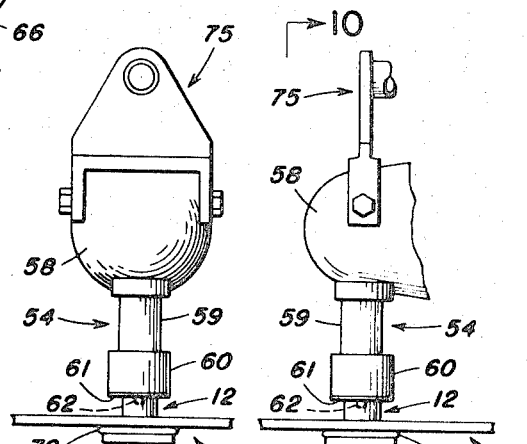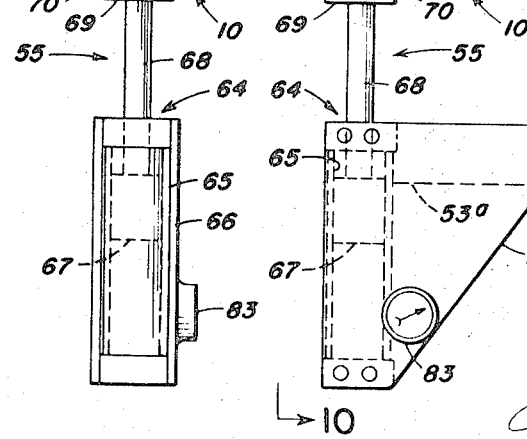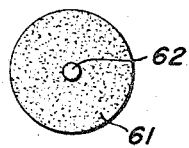

United States Patent Office 3,547,741
Patented Dec. 15, 1970

3,547,741
FRICTION WELDING TOOL
Eugene E. Hewitt, Walkerton, Ind., assignor to Uniroyal, Inc., New York, N.Y., a corporation of New Jersey
Original application Feb. 25, 1966, Ser. No. 530,128, now Patent No. 3,444,018, dated May 13, 1969. Divided and this application Sept. 27, 1968, Ser. No. 798,227
Int. Cl. B23k 27/00; B32b 31/20
U.S. Cl. 156—579                                 6 Claims

ABSTRACT OF THE DISCLOSURE

A portable friction welding tool having a U-shaped frame and including a motor driven, high friction, work engaging surface mounted on one leg of the frame and a power cylinder operated, resilient, work clamping surface mounted on the other leg of the frame, in alignment with the work engaging surface.

---

This is a division of application Ser. No. 530,128, filed Feb. 25, 1966, now U.S. Pat. No. 3,444,018.

This invention relates to methods and apparatus for mounting fastening elements on materials and, more particularly, to the use of thermoplastic friction welding techniques to mount metallic fastening elements on sheets or thermoplastic material.

In fabricating formed or sheet structures of thermoplastic sheet materials, as for example in certain vehicle body applications, it is necessary to provide means for fastening the thermoplastic sheet materials to frame members or other like parts. In order to avoid having fastening elements protrude through the thermoplastic sheet materials and mar the appearance of the structure, blind fastening techniques are often employed in which the fastening elements are cemented to one surface of the thermoplastic sheets. Although a satisfactory fastening arrangement is provided in the foregoing manner, the cementing of fastening elements to a thermoplastic sheet represents a time consuming, expensive operation and provides a bond of limited strength.

It has been determined, in accordance with one embodiment of this invention, that fastening elements can be joined to thermoplastic sheets with considerably greater speed and economy than heretofore known by first embedding the fastening elements in thermoplastic members, as by injection molding for example, and then friction welding the thermoplastic members to the thermoplastic sheets. The bonds thus obtained between the fastening elements and the sheets are extremely strong, in some cases as strong as, or stronger than, the original thermoplastic material and are achieved in an economical, rapid manner—usually in a few seconds. Moreover, the fastening element can be used immediately after being welded to the surface of the sheet.

Accordingly, it is the primary object of this invention to provide an improved method of mounting fastening elements on thermoplastic members.

It is another object of this invention to provide an improved method of mounting fastening elements on sheets of thermoplastic materials.

A further object of this invention is to provide an improved method of mounting metallic fastening elements on sheets of thermoplastic materials through the use of thermoplastic friction welding techniques. Another object of this invention is to provide a portable tool for friction welding annular plastic members to sheets of thermoplastic materials.

An additional object of this invention is to provide improved apparatus for friction welding thermoplastic members having fastening elements embedded therein to sheets of thermoplastic material.

Further objects and advantages of this invention will become apparent as the following description proceeds.

While the specification concludes with claims particularly pointing out and distinctly claiming the subject matter of this invention, it is believed that the invention will be better understood from the following description, taken in conjunction with the accompanying drawings, in which:

FIG. 8 is a side elevational view of a portable tool for friction welding thermoplastic members to one another;

FIG. 9 is a fragmentary side elevational view of the tool of FIG. 8 showing thermoplastic members in position therein to be friction welded to one another; and, FIG. 10 is a front elevational view of the tool, taken along the line 10—10 of FIG. 9.

FIG. 11 is an enlarged plan view of a rough, high friction surface at the lower end of the rotary spindle of the portable tool.

Figure 5:
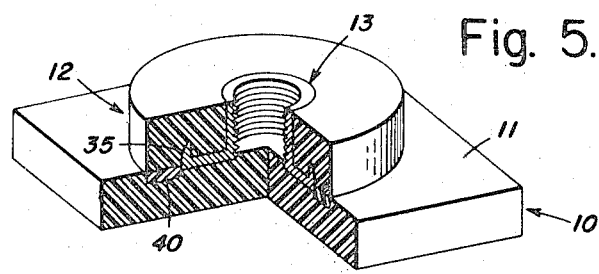
FIG. 5 is a cutaway, perspective view similar to FIG. 4, but showing the thermoplastic member friction welded to a sheet of thermoplastic material, the FIGS. 1 to 5 together comprising one method of mounting a metallic fastening element on a sheet of thermoplastic material.

Referring to the figures, wherein like parts have like numbers in the various views, a first thermoplastic member or sheet of thermoplastic material, on which it is desired to mount a fastening element, is shown generally at 10 in FIG. 5. Thermoplastic sheet 10 has mounted on one of its surfaces 11 by friction welding techniques to be described in greater detail hereinafter a second thermoplastic member, shown generally at 12. Thermoplastic member 12 has embedded therein a fastening element, shown generally at 13, which is preferably of metal.

Figure 1:
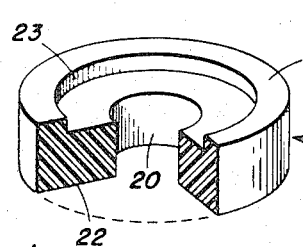
FIG. 1 is a cutaway, perspective view of a thermoplastic member which is adapted to have embedded therein a metallic fastening element.

Referring now to FIG. 1, thermoplastic member 12 is preferably molded or otherwise formed with an annular shape having a central cylindrical opening 20 of predetermined diameter therein. The member 12 is provided with planar surfaces 21 and 22 at opposite ends thereof, the planar surfaces 21 and 22 being perpendicular to the axis of the cylindrical central opening 20. Member 12 further includes a cylindrical recess 23 formed in the end surface 21.

Figure 2:
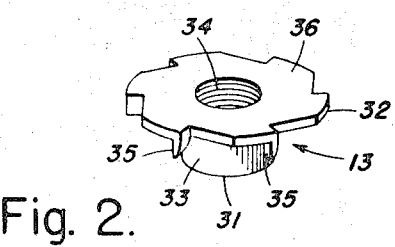
FIG. 2 is a perspective view of a metallic fastening element adapted to be embedded in the thermoplastic member of FIG. 1.

As shown in FIG. 2, metallic fastening element 13 includes an axially extending, annular portion 31 and a radially extending, annular, end portion 32. The axially extending portion 31 is provided with a cylindrical outer surface 33 having a diameter substantially equal to the predetermined diameter of the opening 20 in thermoplastic member 12. It is also provided with a threaded inner surface 34. The radially extending, annular end portion 32 of fastening element 13 is provided with a plurality of axially extending sharp protrusions 35 thereon and an end surface 36. Accordingly, when the fastening element 13 is assembled with the thermoplastic member 12, protrusions 35 penetrate into member 12 and rotationally lock the fastening element relative to the member, as shown in FIG. 3.

Figure 3:
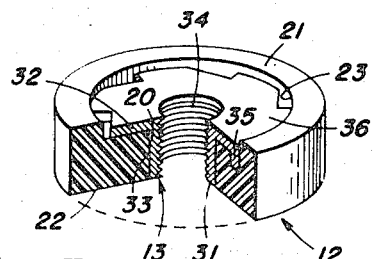
FIG. 3 is a cutaway, perspective view of the thermoplastic member of FIG. 1, having the metallic fastening element of FIG. 2 embedded therein.

In practicing this invention in accordance with the embodiment of FIGS. 1 through 5 a thermoplastic member, such as the one shown at 12 in FIG. 1, and a fastening element, such as the one shown at 13 in FIG. 2, are first provided. Thereafter the fastening element 13 is inserted into the thermoplastic member 12 and embedded therein by pressing the two parts together with sufficient force that the protrusions 35 penetrate into the thermoplastic material of member 12, the end portion 32 of element 13 seats in recess 23, and the cylindrical portion 33 of the fastening element seats in the central opening 20 of the thermoplastic member, as shown in FIG. 3. Alternatively, the member 12 could be injection molded about fastening element 13 to achieve the configuration of FIG. 3.

As shown more clearly in FIG. 4, the planar surface 21 of member 12 preferably projects slightly below the end surface 36 of fastening element 13 when element 13 is seated in member 12. This facilitates subsequent friction welding of thermoplastic member 12 to the thermoplastic sheet 10, as shown in FIG. 5. However, so long as end surface 21 is substantially contiguous to the end surface 36, even though it may be slightly above or below that surface, the benefits of the invention may be achieved.

Figure 4:
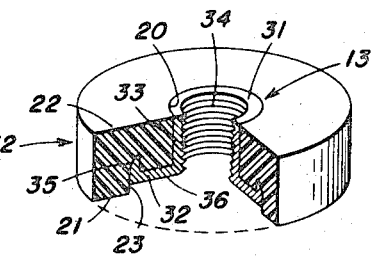
FIG. 4 is a cutaway, perspective view similar to FIG. 3, but showing the thermoplastic member in an inverted position.

Referring now to FIGS. 4 and 5, after fastening element 13 has been embedded in thermoplastic member 12 the surface 21 of member 12 is pressed against the surface 11 of thermoplastic sheet 10 by clamping the two members 10 and 12 together. Thereafter, while the two members are thus clamped, thermoplastic member 12 is rotated relative to member 10, causing the surfaces 21 and 11 to become frictionally heated at their interface. As a result, the thermoplastic materials at the interface of the two surfaces melt and fuse together, as shown at 40. After this, the relative rotation of thermoplastic member 12 to thermoplastic sheet 10 is stopped, while the clamping pressure is retained. When the molten material 40 solidifies, fixedly joining the thermoplastic member 12 and the metallic fastening element 13 embedded therein to the surface of thermoplastic sheet 10, the clamping pressure is released.

Figure 6:
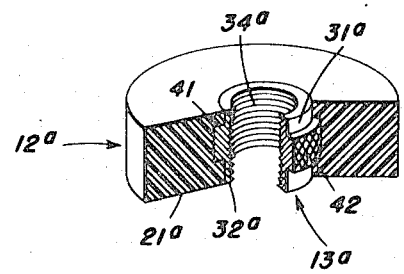
FIG. 6 is a cutaway, perspective view showing an alternate fastening element embedded in a thermoplastic member.
Figure 7:
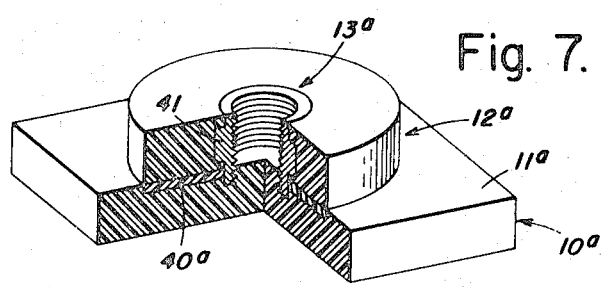
FIG. 7 is a cutaway, perspective view similar to FIG. 6, but showing the thermoplastic member thereof friction welded to a sheet of thermoplastic material, the FIGS. 5 and 6 together comprising an alternate method of mounting a metallic fastening element on a sheet of thermoplastic material.

In the embodiment shown in FIGS. 6 and 7, a metallic fastening element 13a is provided which is of slightly different configuration than the metallic fastening element 13 in the embodiment of FIGS. 1 through 5. Metallic fastening element 13a includes an annular cylindrical portion 13a having internal threads 34a. In place of the radially extending end portion 32 of the metallic fastening element of FIG. 2, the metallic fastening element 13a in the FIGS. 6 and 7 embodiment is provided with a shoulder portion 41 having a knurled outer surface 42 thereon.

In the embodiment of FIGS. 6 and 7, the metallic fastening element 13a is preferably embedded in the second thermoplastic member 12a during an embedding step which includes an injection molding operation. In such an operation, the metallic fastening element 13a comprises an insert in a mold cavity, and the thermoplastic member 12a is injected into the cavity about the insert. The raised shoulder portion 41 on the fastening element 13a serves to axially interlock the fastening element with the thermoplastic member 12a to prevent axial movement therebetween. The knurled surface 42 provides supplementary axial interlocking between the fastening element 13a and the thermoplastic member 12a and, in addition, provides a rotational interlock between the two in order to prevent rotation of element 13a relative to the member 12a during use.

When the embedding step is completed, the thermoplastic member 12a, having the metallic fastening element 13a embedded therein, is clamped or pressed against the surface 11a of a thermoplastic sheet 10a (FIG. 7). Then the thermoplastic member 12a is rotated relative to the sheet 10a while clamping pressure is maintained so as to generate heat and melt the interface of the surfaces in contact. Accordingly, the contacting surfaces fuse, as shown at 40a in FIG. 7. After the surfaces have become molten and fused together, the relative rotation of member 12a is stopped, and clamping pressure is maintained until the molten material at 40a solidifies. At this time, the thermoplastic member 12a, having the metallic fastening element 13a embedded therein, becomes fixedly mounted on the surface 11a of thermoplastic sheet 10a, and the clamping pressure is then released.

As in the case of the FIGS. 1 through 5 embodiment, surface 21a (FIG. 6) is preferably formed substantially contiguous to the end surface 32a of metallic fastening element 13a so as to facilitate friction welding of member 12a to sheet 10a. However, as in the earlier embodiment, slight differences in elevation of the two surfaces do not materially affect the friction welding operation.

Referring to FIGS. 8 through 11, a tool 50 has been illustrated which may be utilized to frictionally weld the fastener bearing-thermoplastic members 12 and 12a to the thermoplastic sheets 10 and 10a. Tool 50 comprises a generally U-shaped, tubular frame 51 including a first or upper leg member 52 and a second or lower leg member 53, each of which members is provided with a respective free end portion 52a and 53a. A rotary means, shown generally at 54, is carried on the end portion 52a of leg 52, and a clamping means, shown generally at 55, is carried on the end portion 53a of leg 53.

Rotary means 54 serves to engage and, upon actuation, rotate one of the thermoplastic members being friction welded, for example member 12 (FIG. 9). Clamping means 55 is adapted to engage the other of the thermoplastic members, for example member 10 (FIG. 9), and is in alignment with the rotary means 54 so as to press the thermoplastic members 10 and 12 against one another upon actuation.

Referring to FIG. 8, the rotary means 54 includes an electric motor 57 aligned with and mounted on the end portion 52a of leg member 52, a right angle drive mechanism 58 fixed to motor 57, and a spindle 59 extending from mechanism 58 at a right angle to leg member 52 toward leg member 53. Spindle 59 is provided with a disc 60 having an annular surface 61 disposed perpendicularly to the axis of the spindle. In addition, disc 60 carries an alignment pin member 62 which projects axially from the surface 61 and serves to align the annular thermoplastic member 12 with the annular surface 61. Motor 57 may, alternatively, be air driven.

In order to insure that the rotation of spindle 59 is transmitted to thermoplastic member 12, surface 61 (FIG. 11) of disc 60 comprises a rough, high friction surface which may be formed, for example, by cementing an annular piece of rough grit sandpaper to the lower surface of disc 60. Accordingly, when clamping means 55 is actuated to compress members 10 and 12 together, roughened surface 61 frictionally engages the upper surface of member 12 and, upon actuation of rotary means 54, causes member 12 to rotate relative to member 10.

The clamping means 55 includes a pneumatically operated power cylinder assembly, shown generally at 64, which includes a cylinder 65 fastened by means of gusset plates 66 to the end portion 53a of leg 53. Power cylinder 65 is mounted at a right angle to leg 53 and extends toward the leg member 52. The assembly 64 further includes a piston 67 movable in cylinder 65 and a piston rod 68 connected at one of its ends to piston 67. A presser member 69 is carried at the other end of piston rod 68 and is moved by the piston rod toward and away from the surface 61 of spindle 59. Presser member 69 is preferably, but not necessarily, provided with a cushioned surface 70 at its end which is adapted to engage the thermoplastic member 10. Cushioned surface 70 may comprise, for example, a layer of cellular elastomeric material to insure that the lower surface of sheet 10 does not become marred during clamping thereof. In addition, the cushioned surface 70 serves to compensate for any intentional or unintentional irregularities or variations in the lower surface of sheet 10.

In operation, the thermoplastic member 12, having a metallic fastening element embedded therein, is positioned atop the surface of thermoplastic sheet 10, at a predetermined desired location thereon. At this point the thermoplastic members 10 and 12 and the tool 50 are positioned in such a manner that the projecting pin 62 and the roughened surface 61 of spindle 59 engage the upper surface of thermoplastic member 12. The clamping means 55 is then actuated to bring the cushioned surface 70 of presser foot 69 into engagement with the lower surface of thermoplastic member 10 to compress the two thermoplastic members together. Thereafter, while the clamping means 55 continues to exert clamping pressure, spindle 59 is rotated, causing member 12 to rotate along with it and melt the thermoplastic materials at the interface between members 10 and 12. When the material becomes molten, the rotation of spindle 59 is stopped, while clamping pressure is maintained. When the molten material solidifies and fuses together, clamping means 55 is deactuated and the joined thermoplastic members are removed from the tool.

The tool 50 is preferably portable and is provided with a hand grip, shown generally at 75. Hand grip 75 is affixed at one of its ends to upper leg 52 and at the other of its ends to the housing of right angle drive mechanism 58. For convenience of operation, hand grip 75 carries a push button switch 76 which serves as a means to actuate the motor 57 of rotary means 54. Switch 76 is wired in series in a flexible conductor 77 which interconnects motor 57 with a suitable source (not shown) of electrical power. A slide switch 78, which serves as a means to actuate clamping means 55, is also carried in hand grip 75. Switch 78 is connected by means of flexible conductors 79 and 80 to a suitable solenoid valve (not shown) which controls the flow of air between a compressed air source (not shown) and power cylinder 65. Suitable flexible conduits 81 and 82 are provided to interconnect the opposite ends of power cylinder 65 with the solenoid valve for operation in a well known manner. A gauge 83 is provided to show the amount of pressure available in the compressed air conduits. Alternatively, the flexible conduit (e.g., conduit 81) which supplies pressurized air to the top surface of piston 67 can be eliminated and replaced by a spring (not shown) positioned between the top surface of piston 67 and the top of cylinder 65. In this case air pressure need only be exerted on the bottom of piston 67 in order to move presser member 69 into engagement with sheet 10. Thereafter, when friction welding has been completed, pressure is released from the bottom of piston 67 and the spring moves the presser member out of engagement with sheet 10.

The term "thermoplastic," as used herein, means or refers to materials which become soft and pliable when heated, without any change in inherent properties of the material. It is intended to include, without limitation thereto, resins such as: Acrylonitrile-butadiene-styrene (ABS), polyvinyl chloride (PVC), whether plasticized or unplasticized; copolymers of vinyl chloride and copolymerizable monomers thereof (plasticized); fused highly plasticized polyvinyl chloride or vinyl chloride copolymers (fused plastisols); blends of vinyls and ABS, polyethylene (PE); polypropylene (PP); styrene-acrylonitrile copolymers; polystyrene; copolymers of styrene and such copolymerizable monomers as alpha methyl styrene; polystyrene blended with butadiene-styrene rubbery copolymers (high impact styrenes); polymethyl methacrylate esters and acrylic resins in general, including thermoplastic polymers or copolymers of acrylic acid, methacrylic acid, the esters of these acids such as the methyl, ethyl and butyl esters, or acrylonitrile; acetal resins such as those made by polymerizing formaldehyde; polycarbonate resins (PC) such as those produced by reacting bisphenol A and phosgene; polyamide resins known as nylons; and polymerized fluorinated hydrocarbons such as polytetrafluoroethylene (TFE).

This invention can be employed where the thermoplastic members 10 and 12 are each of the same kind of thermoplastic resin and it can also be employed where the members 10 and 12 are different kinds of thermoplastic resins which are compatible with one another. Examples of resins which are compatible and will bond to one another using friction welding techniques are shown in the "Compatibility Chart" below. An "X" at the intersection of a horizontal and vertical column indicates the resins concerned will bond to one another using friction welding techniques. An "O" indicates the resins concerned will not so bond to one another.

COMPATIBILITY CHART

|         | ABS | TFE | Acetal | Nylon | PVC | Acrylic | PE | PP | PC |
|---------|-----|-----|--------|-------|-----|---------|----|----|----|
| ABS     | X   | O   | X      | X     | X   | X       | O  | O  | X  |
| TFE     | O   | X   | O      | O     | O   | O       | O  | O  | O  |
| Acetal  | X   | O   | X      | O     | X   | X       | O  | O  | O  |
| Nylon   | X   | O   | O      | X     | X   | O       | O  | O  | X  |
| PVC     | X   | O   | X      | X     | X   | X       | O  | O  | X  |
| Acrylic | X   | O   | X      | O     | X   | X       | O  | O  | X  |
| PE      | O   | O   | O      | O     | O   | O       | X  | X  | O  |
| PP      | O   | O   | O      | O     | O   | O       | X  | X  | O  |
| PC      | X   | O   | O      | X     | X   | X       | O  | O  | X  |

U.S. Pats. No. 2,439,202, No. 2,600,024 and No. 3,018,268, all assigned to the assignee of the present invention, describe suitable thermoplastic compositions which can be used in making either the thermoplastic member 12 to be frictionally welded to the thermoplastic sheet 10, or the sheet 10 itself which comprises the surface to which the thermoplastic member 12 is frictionally welded. U.S. Pats. No. 3,041,220, No. 3,070,817 and No. 3,206,354, all assigned to the assignee of the present invention, describe cellular cored products generally referred to as ABS expanded sheet materials, on which this invention can be advantageously employed.

From the foregoing it will be apparent that this invention provides an improved method for mounting fastening elements on thermoplastic members in such a manner as to avoid marring the finish of the thermoplastic members, the mounting operation being performed in a quick, efficient economical manner and resulting in a strong bond between the fastening element and the thermoplastic member. Moreover, the invention provides a novel portable tool to facilitate the mounting of the fastening element on the thermoplastic member.

Having thus described the invention, what is claimed as new and desired to be protected by Letters Patent is:

1. A hand portable tool for joining thermoplastic members, comprising: a generally U-shaped frame including first and second leg members having respective opposed, spaced apart, free end portions; rotary means carried on one of said free end portions and adapted to engage and, upon actuation, rotate one of said thermoplastic members; means to actuate said rotary means; clamping means including a cylinder and a piston moveable in said cylinder carried on the other of said free end portions and adapted to engage the other of said thermoplastic members, said rotary means and the cylinder and piston of said clamping means being in alignment with one another so as to press said thermoplastic members against one another upon actuation of said clamping means; and means to actuate said clamping means.

2. A tool for joining thermoplastic members, comprising: a generally U-shaped frame including first and second leg members having opposed, spaced apart, end portions; rotary means carried on one of said end portions and adapted to engage and, upon actuation, rotate one of said thermoplastic members, said rotary means being provided with a rough, high friction surface adapted to engage and rotate said one thermoplastic member; means to actuate said rotary means; clamping means carried on the other of said end portions, said clamping means being provided with a cushioned surface adapted to engage the other of said thermoplastic members, said rotary means and said clamping means being in alignment with one another so as to press said thermoplastic members against one another upon actuation of said clamping means; and means to actuate said clamping means.

3. A tool as described in claim 2, wherein said rough, high friction surface comprises a rough grit sandpaper cemented to said rotary means, and said cushioned surface comprises a layer of cellular, elastomeric material.

4. A tool for joining thermoplastic members, comprising: a generally U-shaped frame including first and second leg members having opposed, spaced apart, end portions; rotary means carried on one of said end portions and adapted to engage and, upon actuation, rotate one of said thermoplastic members, said rotary means including an electric motor mounted on the end portion of said first leg member and in alignment therewith, a right angle drive mechanism fixed to said motor, and a spindle extending from said mechanism at a right angle to said first leg member toward said second leg member; means to actuate said rotary means; clamping means carried on the other of said end portions and adapted to engage the other of said thermoplastic members, said clamping means comprising a pneumatically operated power cylinder assembly mounted on the end portion of said second leg member, at a right angle thereto, and extending towards said first leg member, said assembly including a cylinder, a piston movable therein and a piston rod connected at one of its ends to said piston, said clamping means further including a presser member fixed to the other end of said piston rod, said rotary means and said clamping means being in alignment with one another so as to press said thermoplastic members against one another upon actuation of said clamping means; and means to actuate said clamping means.

5. A tool as described in claim 2 wherein said high friction surface is annular in shape and said rotary means further includes a pin member extending from the central portion of said annular surface and perpendicular thereto, said pin member being adapted to engage said one of said thermoplastic members to align said member with said high friction surface.

6. A tool for joining thermoplastic members, comprising: a generally U-shaped frame including first and second leg members having opposed, spaced apart, end portions; rotary means carried on one of said end portions and adapted to engage and, upon actuation, rotate one of said thermoplastic members; means to actuate said rotary means; clamping means carried on the other of said end portions and adapted to engage the other of said thermoplastic members, said rotary means and said clamping means being in alignment with one another so as to press said thermoplastic members against one another upon actuation of said clamping means; means to actuate said clamping means; and a hand grip provided on one of said leg members for carrying said tool, said means for actuating said rotary means and said means for actuating said clamping means each being mounted on said hand grip.

References Cited

UNITED STATES PATENTS

| | | | |
|---|---|---|---|
| 3,062,695 | 11/1962 | Hull | 156—73 |
| 3,235,159 | 2/1966 | Walton et al. | 228—2 |

BENJAMIN A. BORCHELT, Primary Examiner

S. C. BENTLEY, Assistant Examiner

U.S. Cl. X.R.

156—582; 228—2